US008010890B2

(12) United States Patent
Gumz et al.

(10) Patent No.: US 8,010,890 B2
(45) Date of Patent: *Aug. 30, 2011

(54) SYSTEM FOR CREATING AND RENDERING CLIENT-SIDE USER INTERFACES VIA CUSTOM TAGS

(75) Inventors: Thomas R. Gumz, Cambridge, MA (US); Wolfgang Schramm, Duebendorf (CH)

(73) Assignee: International Business Machines Corporation, Armonk, NY (US)

( * ) Notice: Subject to any disclaimer, the term of this patent is extended or adjusted under 35 U.S.C. 154(b) by 513 days.

This patent is subject to a terminal disclaimer.

(21) Appl. No.: 12/211,542

(22) Filed: Sep. 16, 2008

(65) Prior Publication Data

US 2009/0006945 A1 Jan. 1, 2009

Related U.S. Application Data

(63) Continuation of application No. 10/761,139, filed on Jan. 20, 2004, now Pat. No. 7,458,019.

(51) Int. Cl.
*G06F 17/00* (2006.01)
(52) U.S. Cl. ........................................ 715/234; 715/760
(58) Field of Classification Search .................. 715/205, 715/221, 230, 234, 273, 277, 738, 760, 762; 705/14; 704/3
See application file for complete search history.

(56) References Cited

U.S. PATENT DOCUMENTS

| | | | | |
|---|---|---|---|---|
| 5,905,492 A | * | 5/1999 | Straub et al. | 715/744 |
| 5,973,696 A | * | 10/1999 | Agranat et al. | 715/760 |
| 6,009,441 A | * | 12/1999 | Mathieu et al. | 715/236 |
| 6,061,695 A | * | 5/2000 | Slivka et al. | 715/203 |
| 6,112,242 A | * | 8/2000 | Jois et al. | 709/225 |
| 6,456,308 B1 | * | 9/2002 | Agranat et al. | 715/854 |
| 6,470,349 B1 | * | 10/2002 | Heninger et al. | 717/115 |
| 6,665,860 B1 | * | 12/2003 | DeSantis et al. | 717/115 |
| 6,754,900 B1 | * | 6/2004 | Kelley et al. | 719/319 |
| 6,981,212 B1 | * | 12/2005 | Claussen et al. | 715/205 |
| 6,988,240 B2 | * | 1/2006 | Grober et al. | 715/234 |
| 6,990,653 B1 | * | 1/2006 | Burd et al. | 717/108 |
| 7,386,835 B1 | * | 6/2008 | Desai et al. | 717/117 |
| 2002/0046109 A1 | * | 4/2002 | Leonard et al. | 705/14 |
| 2003/0028555 A1 | * | 2/2003 | Young et al. | 707/204 |
| 2003/0078949 A1 | * | 4/2003 | Scholz et al. | 707/505 |
| 2004/0098246 A1 | * | 5/2004 | Welch et al. | 704/3 |
| 2004/0125130 A1 | * | 7/2004 | Flamini et al. | 345/738 |
| 2004/0205525 A1 | * | 10/2004 | Murren et al. | 715/505 |

(Continued)

OTHER PUBLICATIONS

JavaScript Utopia, "Client-Side includes," © May 31, 2001, downloaded from <"http://web.archive.org/web/20010712051348/http://www.mock.org/webdesign/javascript/client-side-include/">, archive date Jul. 12, 2001, 2 pages total.*

(Continued)

*Primary Examiner* — Amelia Rutledge
*Assistant Examiner* — James H Blackwell
(74) *Attorney, Agent, or Firm* — David A. Dagg

(57) ABSTRACT

A system for creating, rendering and controlling a user interface is provided. A server generates a mark-up language document containing custom tags and conventional tags. The custom tags are associated with machine-executable instructions operating on a client device. When the client device receives the markup language document containing custom tags, the client device processes the custom tags and inserts the machine-executable code into the document at the location of the custom tags. A browser operating on the client device then executes the code and renders the document on a display device.

13 Claims, 7 Drawing Sheets

U.S. PATENT DOCUMENTS

2005/0022116 A1* 1/2005 Bowman et al. .............. 715/513

OTHER PUBLICATIONS

Lennox, Gareth, "Client Side Includes," © Oct. 10, 2001, downloaded from <"http://www.archive.org/web/20030225123526/http://ghp.dwakn.com/content/csi/">, archive date Dec. 25, 2003, 2 pages total.*

UserLand, "Client Side Includes," © Aug. 27, 1997, downloaded from <"http://web.archive.org/web/19980131210846/http://www.scripting.com/midas/clientIncludes.html">, archive date, Jan. 31, 1998, 1 page total.*

* cited by examiner

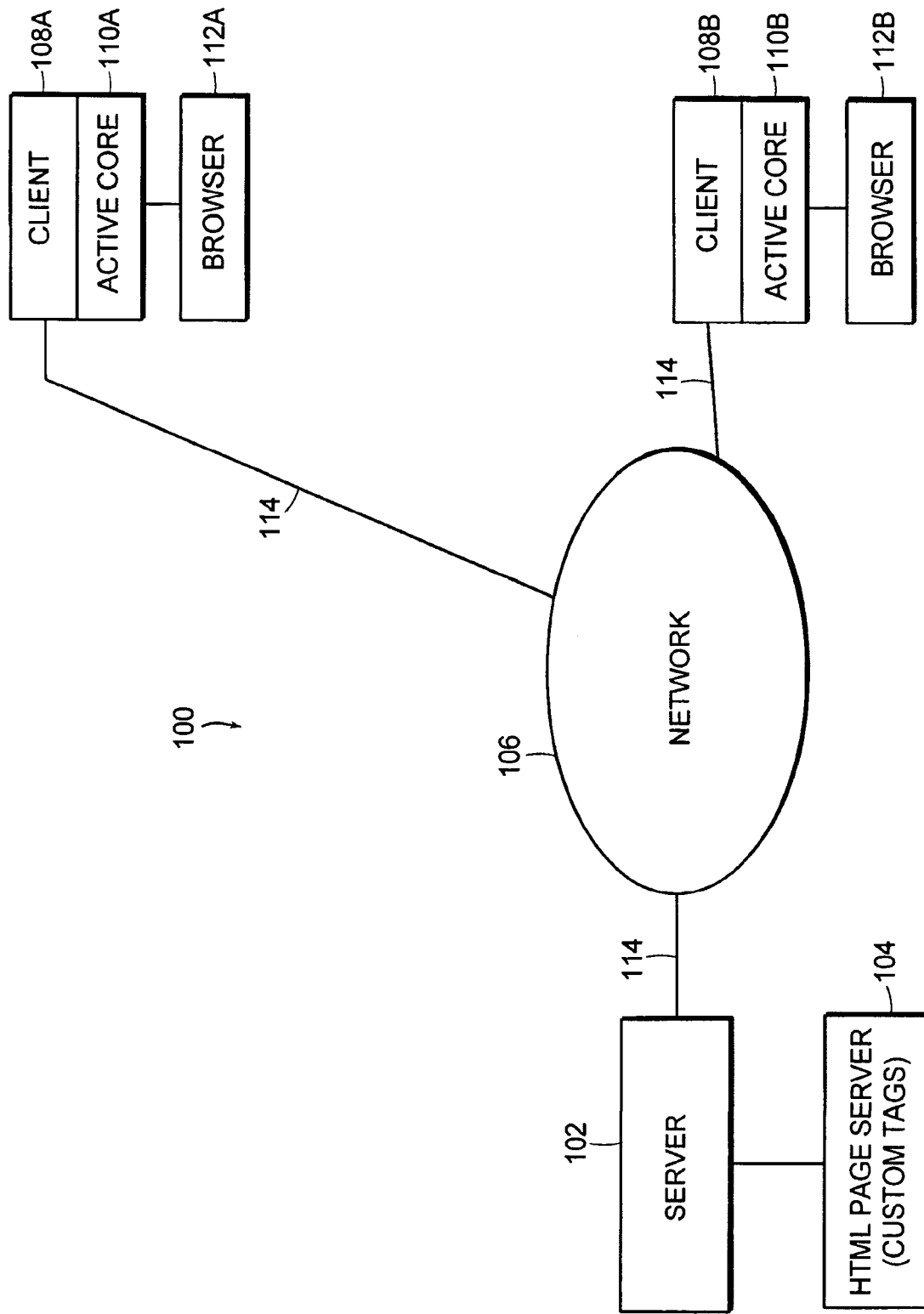

SYSTEM FOR CREATING AND RENDERING CLIENT-SIDE USER INTERFACES VIA CUSTOM TAGS

CROSS-REFERENCE TO RELATED APPLICATIONS

The present application is a continuation under 35 U.S.C. 120 of commonly assigned prior U.S. application Ser. No. 10/761,139, filed Jan. 20, 2004 in the names of Thomas Gumz and Wolfgang Schramm, now U.S. Pat. No. 7,458,019.

BACKGROUND OF THE INVENTION

Proliferation of computer networks along with wide spread use of personal computers has facilitated the emergence of numerous applications and services utilizing these data networks, such as the Internet. Often these applications and services must exchange data over the network. Typically, these data exchanges take place between a server and a client. A server is a computer or device on a network that manages network resources or that provides data, services and functionality to multiple users. For example, a server may run a web-server interface for sending data, for example, web pages to a plurality of users and for receiving requests for data over the network. Web-server equipped devices are often referred to as web sites and are accessed using a universal resource locator (URL) sent from a client. Since servers must handle a plurality of tasks simultaneously, they are often expensive and complex. In contrast, a client device, or client, is a computer or device on the network that is used to access a server. Typically, a client is used by a user, or customer, and is comprised of a personal computer, therefore, it does not have to run several tasks or serve multiple users simultaneously.

In many Internet applications, servers send data to clients for display to a user. At the client, received data is displayed to the user using a browser and a display device such as a monitor. A browser is a software program executing on a client device for processing and displaying information received from web sites. Browsers have processing power that is under utilized in many prior art client-server Internet transactions. Browser processing is under utilized because servers incur the processing load for creating, rendering and controlling content displayed on clients. This requires that servers run applications such as Java server pages (JSP) or Java server faces (JSF) in order to render data on client browsers via static pages, i.e. pages that do not change and that do not require client side processing. Executing applications, such as JSP and JSF, make server side programming complex because not all client computers are of the same type or operating system. This raises the cost associated with operating servers on the Internet or other networks.

There exists a need for a method on the client-side for creating and rendering network content utilizing the processing capabilities of the browser, thus reducing the complexity of software executable instructions on servers. Furthermore, there is a need for allowing the use of active hypertext markup language (HTML) pages without placing an undue burden on the server.

SUMMARY OF THE INVENTION

The preferred embodiments of the present invention are directed to creating, rendering, and/or controlling user interfaces over a data communications network, and more particularly to rendering client side user interfaces through the use of a browser and custom tags contained within a data stream.

In accordance with a preferred embodiment of the invention, a method operating on a client computer for loading a markup language document is provided. The method includes receiving the document which contains a plurality of tags with at least one of the tags being a custom tag. The method parses the document to determine if certain of the plurality of tags are custom tags. Executable instructions are associated with the custom tag if it is present in the document. The instructions are executed and the document is rendered on a display device.

In accordance with another embodiment of the invention, a method for creating and providing a markup language document to a network is provided. A document is loaded into memory, where the document contains conventional tags and at least one custom tag which is associated with machine-executable instructions resident on a receiving computer in communication with the network. The receiving computer is capable of identifying the custom tag and inserting the machine-executable instructions into the document at a location associated with the custom tag. Then the document is provided to the receiving computer over the network.

In accordance with still another embodiment of the invention, an apparatus for receiving a markup language document containing a plurality of tags over a network is provided. The document includes a plurality of tags made up of a first subset of tags which is comprised of custom tags associated with function-executable instructions and a second subset which is comprised of conventional tags. The apparatus includes a display device for presenting information to a user. A browser is operatively connected to the display device for parsing the document and detecting the custom tags and the conventional tags. The apparatus further includes a memory storing a first set of instructions for operating the browser and further storing a second set of instructions for implementing the function-executable instructions. The apparatus also includes a processor, communicatively associated with the memory and the display device, which is capable of executing the first and second set of machine-readable instructions.

The foregoing and other features and advantages of the system and method for creating, rendering and controlling user interfaces will be apparent from the following more particular description of preferred embodiments of the system and method as illustrated in the accompanying drawings in which like reference characters refer to the same parts throughout the different views.

BRIEF DESCRIPTION OF THE DRAWINGS

FIG. 1 illustrates a preferred embodiment of a system for creating, rendering and controlling user interfaces using custom tags in accordance with the present invention;

Figure 2A:
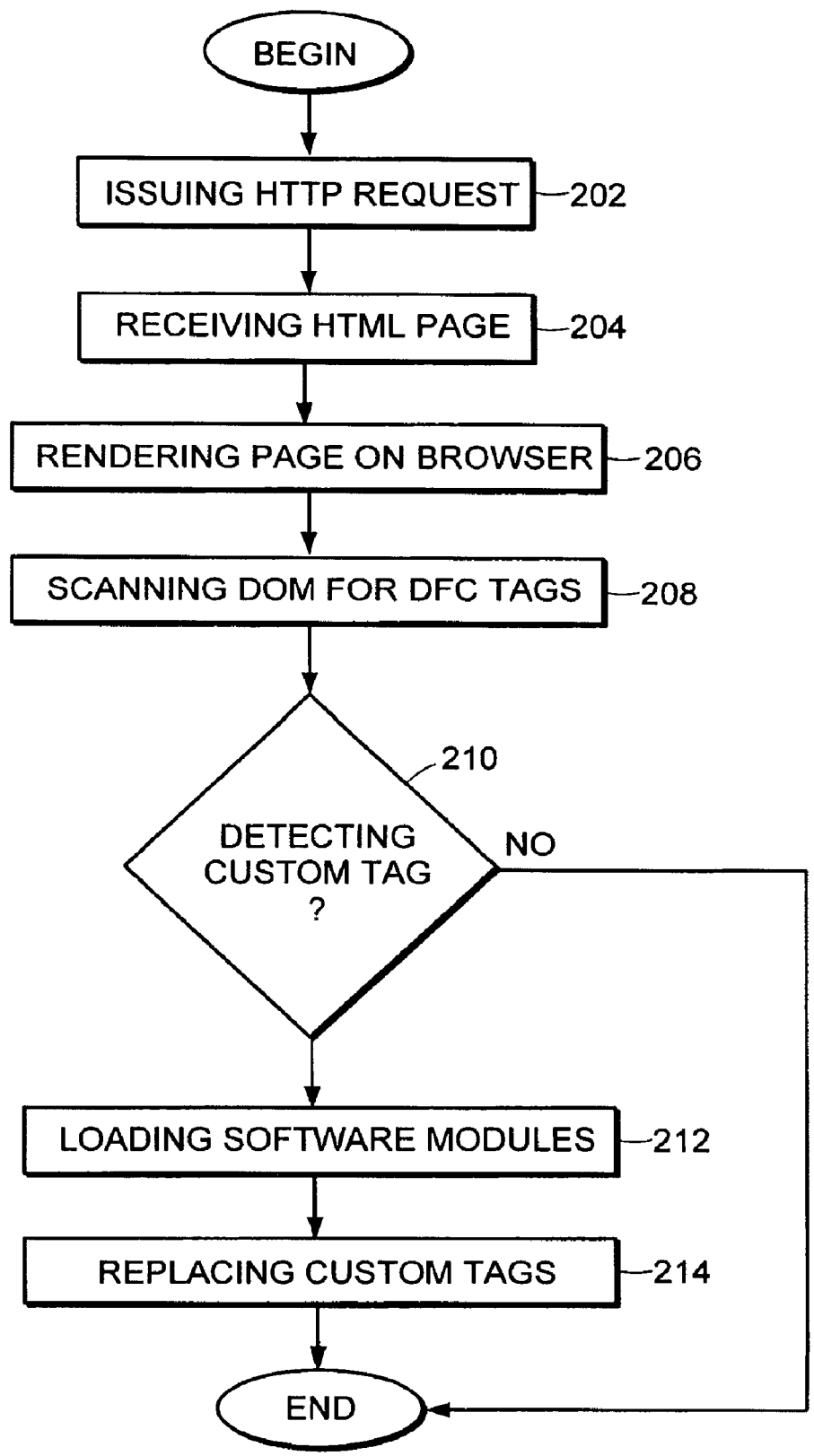
FIG. 2A illustrates a flow chart of a method operating on a client device for using markup language pages containing custom tags to create and render user interfaces in accordance with a preferred embodiment of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The following detailed description of the invention refers to the accompanying drawings. The same reference numbers in different drawings may identify the same or similar elements. Also, the following detailed description does not limit the invention. Reference will be made in detail to exemplary embodiments of the present invention, examples of which are illustrated in the accompanying drawings. While exemplary embodiments are provided, other embodiments are possible in light of the specification. Therefore, unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems and methods. Additionally, the shapes and sizes of components are also exemplary and unless otherwise specified, can be altered without affecting the disclosed systems and methods and without departing from the spirit and scope of the invention.

In current internet protocol (IP) networks, interactions between a server, for example, a web server and a client may involve a markup language page such as a hypertext markup language (HTML) page. An HTML page is a structured document containing formatting information and content. Formatting information provides the browser with information such as the location of the content and instructions of how to display it. In HTML, formatting is accomplished through the use of mark-up, more commonly referred to as tags.

Tags are additional text in a document that is not part of the content but, rather, is used to enhance the document in some way. For example, in HTML, tags are normally denoted with brackets "<" or ">". More specifically, content is contained between a start tag and an end tag. For example, content comprising the title of an HTML page might be "An HTML Page". In the HTML document the title might look like.

<title>An HTML Page</title> where <title> is the start tag for title and </title> is the end tag. Use of tags provides an HTML document with a specific structure which can be used to facilitate processing. In addition, structured documents make it possible to use software constructs such as document object models (DOMs) to further facilitate processing and utilization of markup language content.

A DOM is a standard application programming interface (API) to the structure of a document which allows programmers to write applications that work properly on all compliant platforms. A programmer may need to use a different programming language for executing instructions on particular processors or operating systems; however, the DOM does not need to be changed. Use of DOMs greatly facilitates processing markup language pages across numerous platforms. By way of example, use of markup language pages, for example, HTML pages, over a network may occur as follows: a client side browser issues a hypertext transfer protocol (HTTP) request to a server over a network. The server receives and processes the request and generates the appropriate content with the aid of a java server page (JSP) Engine. The server then sends the results to the browser as a hypertext markup language (HTML) page. The browser receives and interprets the HTML page and then displays it to a user. As seen from the example, the browser does very little in the way of processing when rendering the HTML page for display.

An exemplary embodiment of the invention is used to place more processing demand on the browser while removing it from the server, thus lowering the complexity and cost associated with the server.

FIG. 1 illustrates a preferred system for practicing embodiments for creating, rendering and controlling user interfaces in accordance with the present invention. System 100 includes a server 102, a HTML page server 104, network 106, client 108A and B, each further including active core 110A and B and browser 112A and B, respectively, and network communication links 114. The network can include a packet-switched network such as, for example, the Internet, without limitation.

Server 102 may include a general-purpose computer executing machine-readable instructions for facilitating communication of data across network 106. Server 102 may further include HTML page server 104. HTML page server 104 is comprised of executable instructions for making HTML pages available to client 108A, 108B and may operate as part of, or in conjunction with, a server interface. HTML page server 104 is further configured to insert customized tags into HTML pages before transferring them over network 106. Customized tags, as used herein, refer to custom HTML tags inserted by the server which are used by the browser to process received HTML pages in accordance with embodiments of the invention. Customized tags are discussed in more detail in conjunction with the description of browser 112 hereinafter. Conventional tags refer to tags, or markup, other than customized tags.

Network 106 may be any type of data network such as a local area network (LAN), a metropolitan area network (MAN), or a wide area network (WAN). Furthermore, network 106 may utilize any network protocol, or combination of protocols, such as frame relay, packet switched, Internet protocol (IP), synchronous optical network (Sonet), asynchronous transfer mode (ATM), and the like, without limitation. Communication links 114 are used to convey data across network 106 and may be comprised of twisted pair cable, coaxial cable, optical fiber, free-space optical links, radio-frequency (RF) links, or the like.

Client 108A and B, herein generally referred to as client 108, may be comprised of a general-purpose computer such as, for example, a personal computer, personal digital assistant (PDA), and a web enabled cell phone. Client 108 may have a plurality of executable applications provided on computer-readable media with at least one of the applications being browser 112. Client 108 may further include an active core 110 which is comprised of executable instructions and is used by browser 112 when processing custom tags. More specifically, when browser 112 interprets a custom tag in a markup language document, active core 110 is used to process the tag by modifying the in memory DOM of an incoming document by inserting executable instructions in place of the custom tag. The use of the active core 110 allows a user interface, or other self-contained software application such as an agent, to be launched on client 108. The active core 110 is further described with respect to the description of FIG. 2A.

FIG. 2A is a flowchart illustrating an exemplary method 200 for requesting and receiving a markup language document, here an HTML page, at client 108 in accordance with a preferred embodiment of the present invention. The method 200 begins when browser 112 issues an HTTP request to server 102 over network 106 per step 202. Server 102 processes the request and sends the appropriate content over network 106 to client 108. Browser 112 begins receiving the requested HTML page per step 204. The received page is rendered on the browser per step 206. The method then scans the DOM for the presence of custom tags per step 208. The browser processes all tags, custom and conventional. The custom tags remain active in the DOM and if a custom tag is detected, per step 210, a software module comprising machine-executable instructions is loaded per step 212. In contrast, if no custom tags are detected in step 210, the metered ends and the completed page is rendered on a display device. Machine executable instructions loaded in step 212 are then inserted in place of the custom tags in the received document per step 214. The loaded machine-executable instructions are then executed and the complete document is rendered on a display device.

The use of custom tags in preferred embodiments of the present invention offloads processing from the server and places it on the client. In addition, custom tags make it possible to more easily implement dynamic HTML pages because processing associated therewith occurs on the client device. Use of dynamic HTML pages makes it possible to provide, for example, but not limited to, motion and interactive input/output in connection with displayed HTML pages. In addition, custom tags and the associated functional instructions facilitate the use of display trees in HTML without requiring any programming knowledge on the part of the client side user.

Figure 2B:
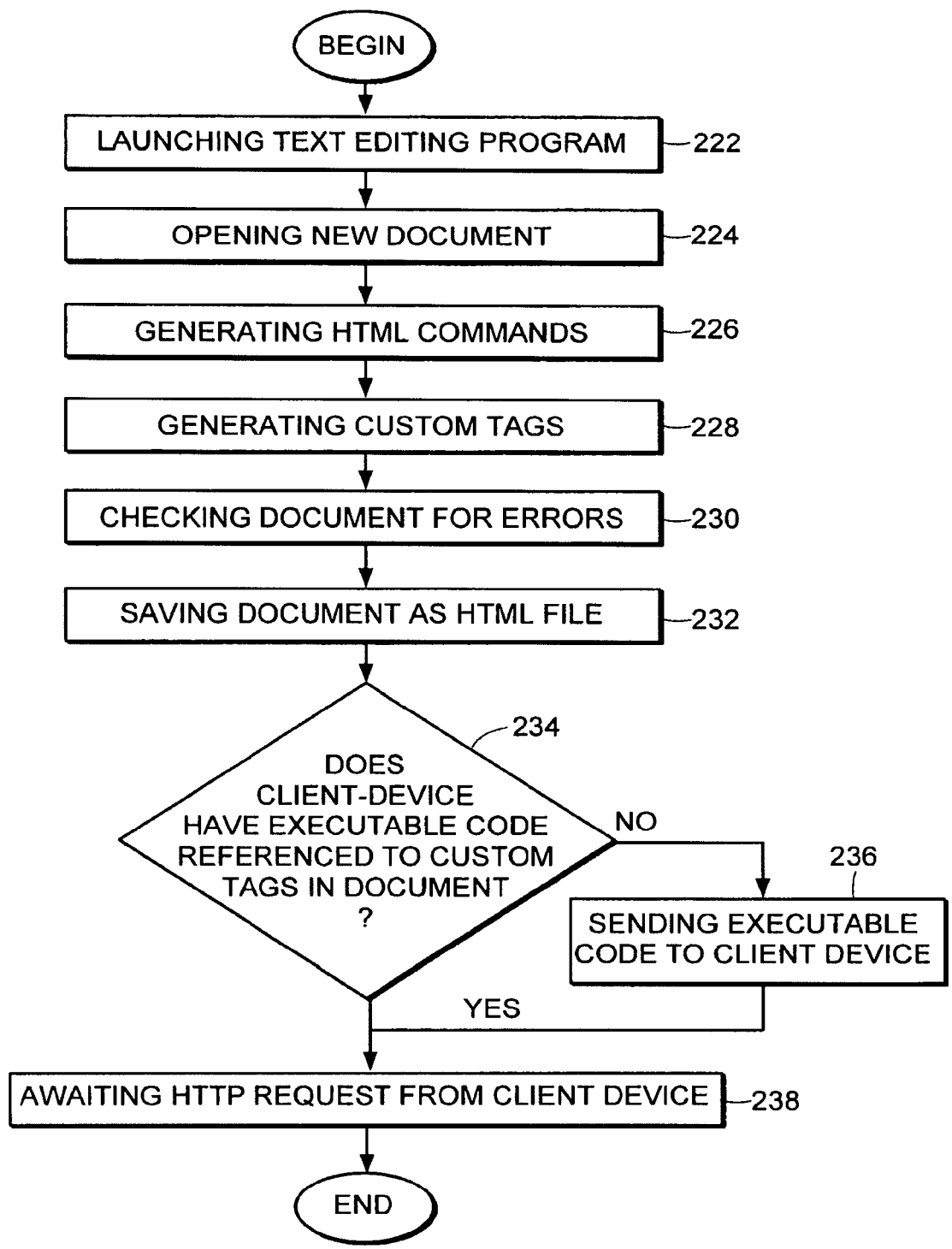
FIG. 2B illustrates a method for creating and rendering a markup language document in accordance with a preferred embodiment of the present invention.

FIG. 2B illustrates an exemplary method for creating a markup language document, here an HTML document, consistent with embodiments for the invention. The method begins when a text editing program is launched on a computer per step 222. After launching the program, a new document is opened per step 224. HTML commands, arguments, and content may be generated using the text editing program per step 226. Custom tags may also be generated as needed per step 228. After generating all HTML code, or instructions, required for the particular application, the document may be checked for errors manually by an operator or via a processing device such as a computer per step 230. The checked document may be saved in computer-readable memory as an HTML file for use by client 108.

Next, a check may be made to determine if client 108 has access to executable instructions referenced by any custom tags contained in the document per step 234. If client 108 does not have access to executable instructions necessary to accommodate the custom tags, the necessary instructions can be sent using network 106 per step 236. If client 108 does have the necessary executable instruction, a server 102, containing the HTML document, can await an HTTP request form client 108 per step 238.

Figure 3:
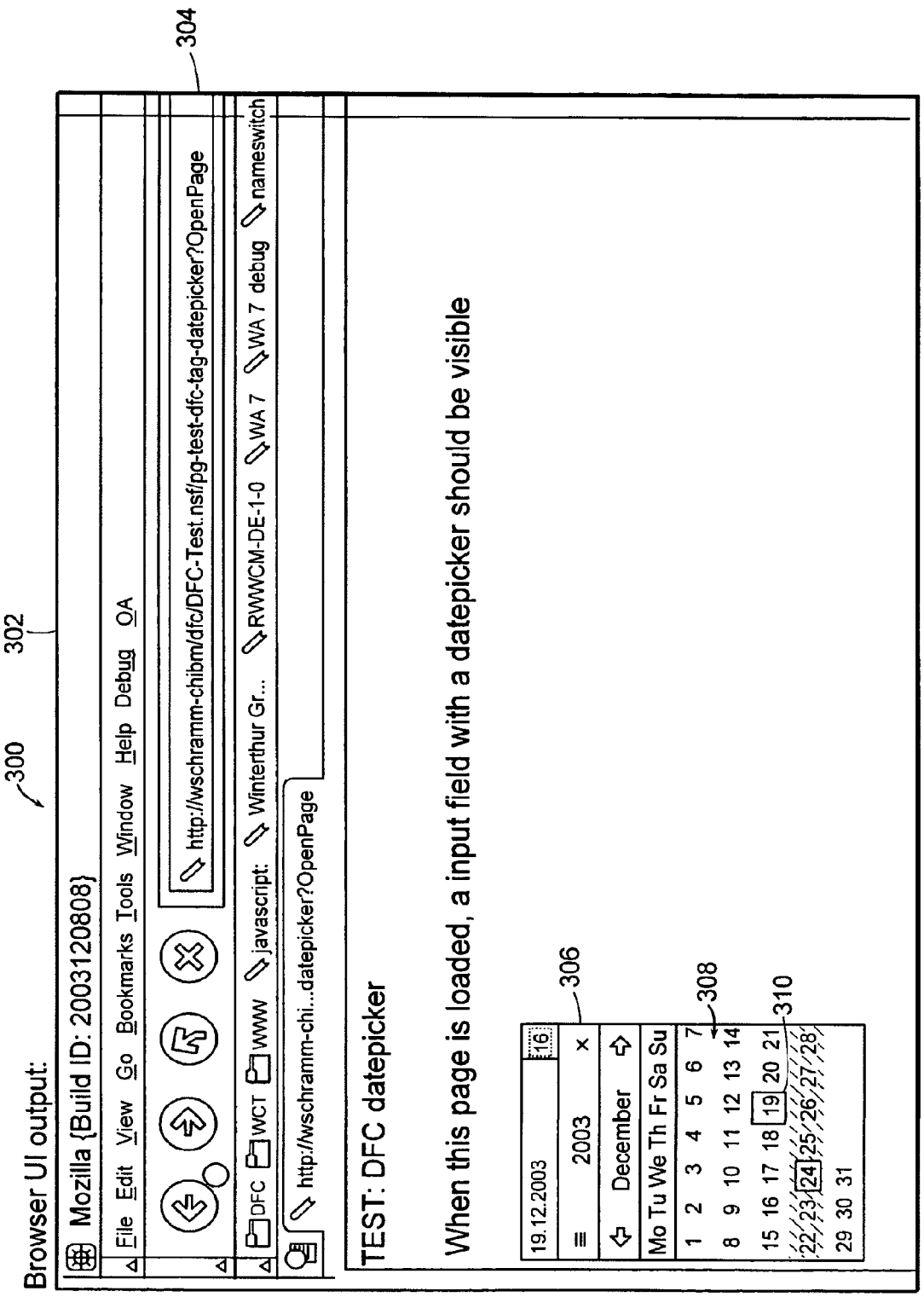
FIG. 3 illustrates an exemplary user interface for a date picker application in accordance with a preferred embodiment of the present invention.

FIG. 3 illustrates an interactive date picking user interface rendered using a preferred embodiment of the present invention. Exemplary date picker user interface display 300 includes a tool bar 302, an address window 304, month field 306, date field 308, and selected date 310. User interface 300 may be displayed on a display device, for example, but not limited to, a cathode ray tube (CRT), and flat panel display, or the like in a human-readable form. User interface 300 may further be displayed using a conventional browser such as Mozilla™ or Internet Explorer™ adapted to handle custom tags. User interface 300 may further include a tool bar 302 containing drop down menus for facilitating access to commonly used functions. For example, clicking on File using a user interface device, such as a computer mouse, may cause a drop down menu to appear. Choices in the drop down menu may allow a user to, for example, without limitation, print the display, save the display to a file, and open a new display window.

User interface 300 may further include an address window 304 for displaying a URL associated with the server providing the date picker application in accordance with a preferred embodiment. User interface 300 can also include a month field 306 for indicating the month displayed to the user. The right and left facing arrows to either side of month field 306 may provide interactive functionality to a user by causing the displayed month to scroll to the immediately subsequent or prior month, respectively, when clicked on. Date field 308 displays all days in the displayed month. When the user scrolls over a particular date with a user interface device, a box may appear as shown by selected date 310. Clicking on selected date 310 may open a pop-up window allowing the user to enter information such as, for example, but not limited to, meetings, doctors' appointments, anniversaries.

For an incoming HTML page, the date picker function illustrated in FIG. 3 may be referenced by one or more custom tags. For example, the content of date picker display 300 may be rendered to a user by way of the following exemplary syntax within an HTML page received from server 102:

```
<body>
TEST: DFC datepicker<br><br>
When this page is loaded, an input field with a datepicker should be
visible<br><br>
<input type="text" id="inpDate"><dfc type="datepicker" for=
"inpDate"></dfc>
</body>
```

In the above example,
    <dfc type="datepicker" for ="inpDate"></dfc>
is the command that causes date picker display 300 to be rendered. In particular, DOM foundation classes (dfc), "dfc" is the tag used to instruct the HTML parser to invoke methods described herein, namely instructing active core 110 to insert executable instructions required for rendering date picker display 300 directly into the loading HTML page at the location associated with the "dfc" tag. In this manner, the processing associated with rendering that date picker display 300 is performed without help from server 102 and without requiring that additional data be sent over network 106 to client 108.

Figure 4A:
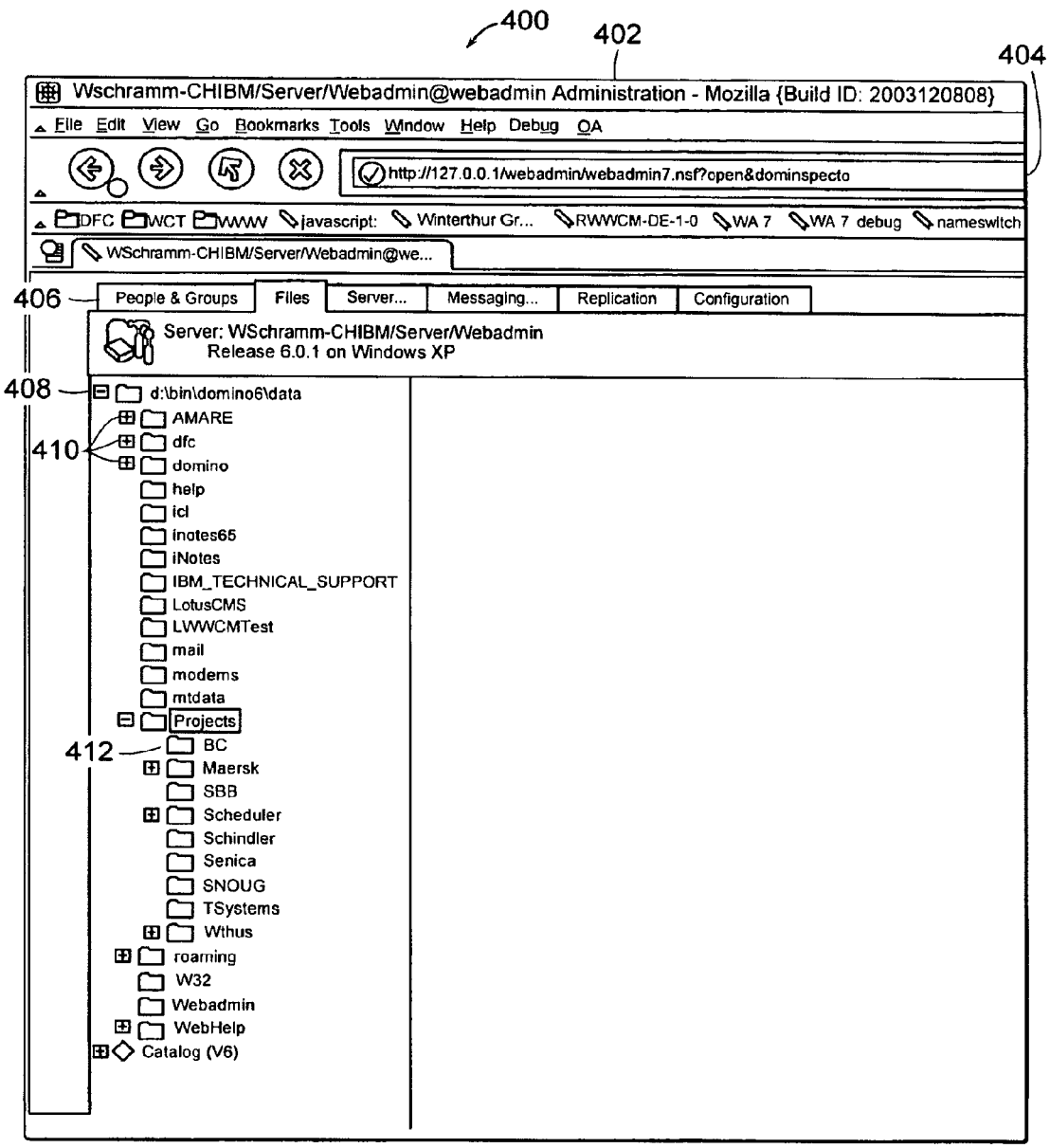
FIG. 4A illustrates an exemplary user interface for a tree control in accordance with a preferred embodiment of the present invention.
Figure 4B:
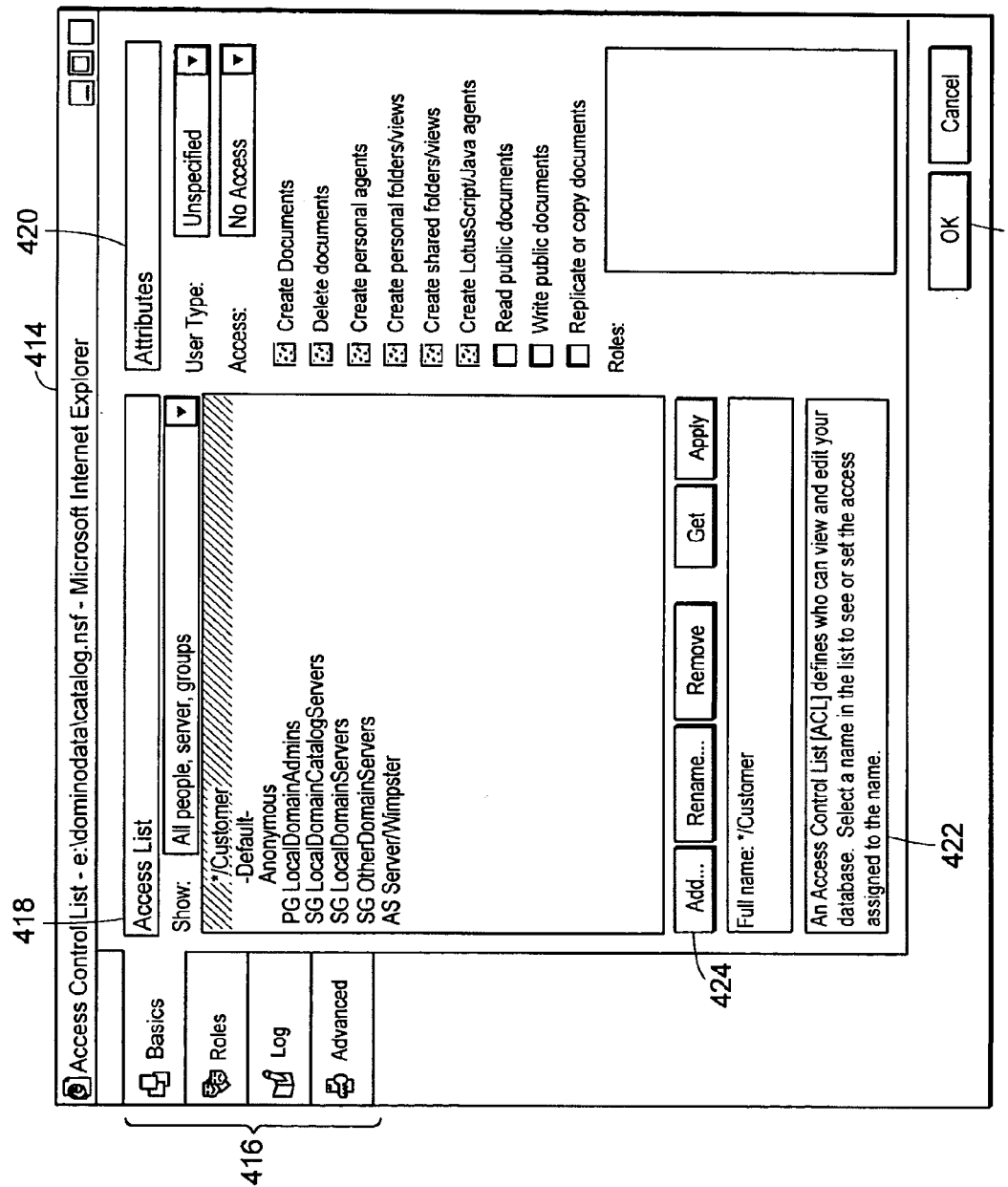
FIG. 4B illustrates an exemplary alternative manner for presenting a tree control display to a user in accordance with a preferred embodiment of the invention.

FIGS. 4A and 4B illustrate an exemplary user interface for a tree control in an HTML application implemented using an embodiment of the present invention. Tree controls are useful for allowing data to be displayed in browsers as Windows® tree directories. Using methods consistent with the invention, a user may define tree nodes and icons to render the display of FIGS. 4A and 4B. In FIG. 4A, a tree control display 400 includes a tree tool bar 402, a tree address window 404, page tabs 406, node icon 408 and sub-node icons 410, and lower-level node icons 412.

Tree control display 400 is rendered on a user display using browser 112 to process an incoming HTML page in accordance with the method described in FIG. 2A. Tree control display 400 may include tree tool bar 402 for facilitating access to common functionalities. Tree tool bar 402 may be essentially the same as tool bar 302 or it may incorporate additional or different functionalities depending on user needs and preferences. Tree address window 404 may contain the URL for the server providing the tree control HTML page. Depending on user preferences, tree address window 404 may contain other URLs or aliases to URLs.

Page tabs 406 are provided for organizing information displayed to a user. By way of example, a "Files" tab may be clicked on using a user interface device to provide a user with a display showing node 408, sub-nodes 410 and lower level nodes 412. Node 408 may be used to represent data as part of a hierarchical display. Node 408 typically represents the highest, or topmost, level and it may be referred to using many conventional nomenclatures such as, for example, but not limited to, tree, parent, root directory, etc. In tree control display 409, node 408 represents a directory associated with a hard drive which is denoted as "d". Sub-nodes 410 may be used to represent data associated with a level lower than that of node 408. Sub-nodes 410 may also be referred to using other conventional nomenclatures such as, for example, but not limited to, branch, child, sub-directory, etc. In FIG. 4A, sub-nodes 410 are used to represent sub-directories of node 408. Lower-level nodes 412 may be used to show progressively lower level data groupings. Any number of lower level nodes may be used with embodiments of the invention; however, only a single lower-level node 412 is shown for simplicity in FIG. 4A. Lower-level nodes 412 may be referred to using other conventional nomenclatures such as, for example, leaves, grandchildren, etc.

FIG. 4B illustrates an exemplary of an alternative manner for presenting a tree control display to a user in accordance with a preferred embodiment of the invention. FIG. 4B includes tree identifiers 416, access list 418, attribute window 410, information window 422, action buttons 424, and user control buttons 426.

Tree identifiers 416 provide text and/or graphical representations of trees being displayed to a user. Tree identifiers 416 may represent directories, hard drives, servers, or any other type item, data, location, etc. Access list 418 may include a window for allowing a user to specify or select access information related to tree identifiers 416. For example, access list 418 may specify an individual or group having permission to display, access, or utilize data and information associated with tree identifiers 416. Attribute window 420 allows a user to associate attributes with data referenced by tree identifiers 416. Attributes associatable with tree identifiers 416 may include, but are not limited to read/write privileges, display formats, software agents, etc. Information window 422 provides a user with additional information about tree identifiers 416 or information associated therewith. Additionally, information window 422 may also provide a user with instructions on how to use or access information and data associated with tree identifiers 416. User control buttons 422 allow the user to make selections and/or decisions about information contained in display 414. For example, user control buttons 422 may allow the user to accept information displayed on display 414 or to reject it.

Tree control display 414 may be implemented using the following HTML executable instructions. In the example below, a user need only define parameters such as the tree nodes and icons to render tree control display 414 on a display device.

```
<dfc:tree id='treeNavi'
css='panel-navi'
onselect='var hTreeNode = arguments[0].param1;
hDlg.onSelectPanel(hTreeNode);'
onbeforeselect='var hTreeNode = arguments[0].param1; return
hDlg.onBeforeSelectPanel(hTreeNode);'>
<dfc:treenode parent='treeNavi' id='nodeBasics' label='Basics'
icon='//tabBasics.gif'> </dfc:treenode>
<dfc:treenode parent='treeNavi' id='nodeRoles' label='Roles'
icon='//tabRoles.gif'> </dfc:treenode>
<dfc:treenode parent='treeNavi' id='nodeLog' label='Log' icon=
'//tabLog.gif'>
</dfc:treenode>
<dfc:treenode parent='treeNavi' id='nodeAdvanced' label='Advanced'
con ='//tabAdvanced.gif'> </dfc:treenode>
</dfc:tree>
```

In a manner consistent with the example discussed in connection with FIG. 3, the "dfc" tag is used by the HTML parser to instruct active core 110 to substitute the executable instructions required for rendering tree control display 400 into the incoming HTML page at the specified location(s).

Figure 5:
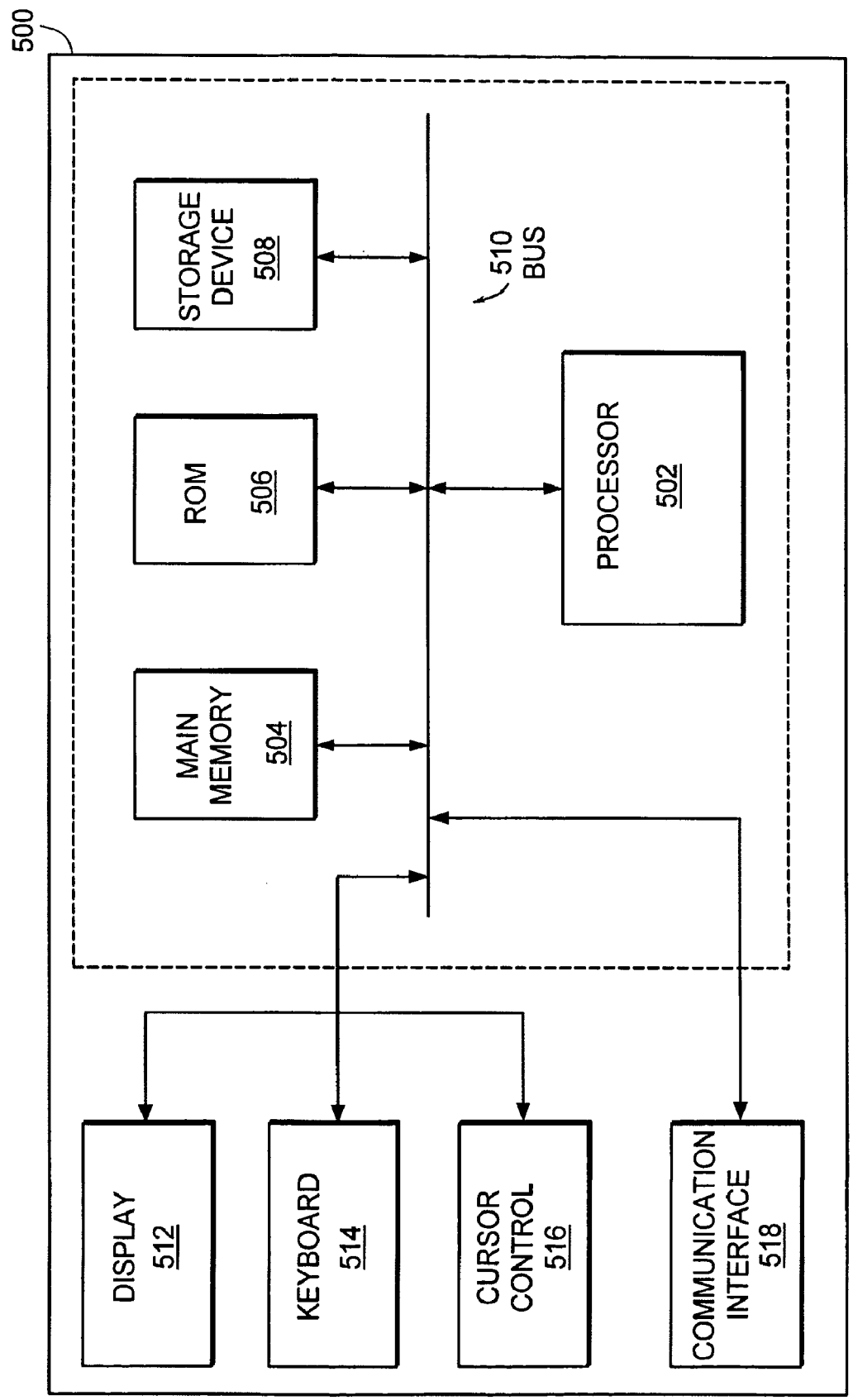
FIG. 5 illustrates a schematic diagram for a general-purpose computer configuration for practicing preferred embodiments in accordance with the present invention.

FIG. 5 illustrates an exemplary general-purpose computer architecture useful for practicing preferred embodiments of the present invention. General-purpose computer 500 may include a processor 502, main memory 504, read only memory (ROM) 506, storage device 508, bus 510, display 512, keyboard 514, cursor control 516, and communication interface 518. Processor 502 may be any type of conventional processing device that interprets and executes instructions. Main memory 504 may be a random access memory (RAM) or a similar dynamic storage device. Main memory 504 stores information and instructions in machine-readable form for execution by processor 502. Main memory 504 may also be used for storing temporary variables or other intermediate information during execution of instructions by processor 502. ROM 506 stores static information and instructions for processor 502. It will be appreciated that ROM 506 may be replaced with other types of static storage devices such as programmable ROM, erasable programmable ROM, and the like. Data storage device 508 may include any type of magnetic or optical media and its corresponding interfaces and operational hardware. Data storage device 508 stores information and instructions for use by processor 502. Bus 510 includes a set of hardware lines (conductors, optical fibers, or the like) that allow for data transfer among the components of computer 500.

Display device 512 may be a cathode ray tube (CRT), liquid crystal display (LCD), or the like, for displaying information to a user. Keyboard 514 and cursor control 516 allow the user to interact with computer 500. Cursor control 516 may be, for example, a mouse. In an alternative configuration, keyboard 514 and cursor control 516 can be replaced with a microphone and voice recognition means to enable the user to interact with computer 500.

Communication interface 518 enables computer 500 to communicate with other devices/systems via any communications medium. For example, communication interface 518 may be a modem, an Ethernet interface to an IP network, or a printer interface. Alternatively, communication interface 518 can be any other interface that enables communication between computer 500 and other devices or systems.

By way of example, a computer 500 consistent with the present invention provides a server with the ability to communicate markup language pages over network 106 to a client 108. Computer 500 performs operations necessary to complete desired actions, such as generating a markup language page containing custom tags, in response to processor 502 executing sequences of instructions contained in, for example, memory 504. Such instructions may be read into memory 504 from another computer-readable medium, such as a data storage device 508, or from another device (not shown) via communication interface 518. Execution of the sequences of instructions contained in memory 504 may cause processor 502 to perform a method for placing the markup language page on a network for transmission to client 108 in response to an HTTP request received therefrom. Alternatively, hard-wired circuitry may be used in place of or in combination with software instructions to implement the present invention. Thus, the present invention is not limited to any specific combination of hardware circuitry and software.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on processing an HTML page, implementations consistent with the principles of the invention are equally applicable to other markup languages such as eXtensible markup language (XML), business rules markup language (BRML), and the like. And, while a series of method steps have been described with regard to FIGS. 2A and 2B, the order of the steps may be varied in other implementations consistent with the present invention. Moreover, non-dependent steps may be implemented in parallel if desired.

No element, step, or instruction used in the description of the present application should be construed as critical or essential to the invention unless explicitly described as such. Also, as used herein, the article "a" is intended to include one or more items or elements. Where only one item is intended, the term "one" or similar language is used.

Many alternative embodiments of the present invention are possible in light of the teachings hereinbefore. For example, in a first alternative embodiment, client 108 may be practiced in a distributed architecture. In a distributed architecture, active core 110, browser 112, display device 512 and processor 502 may be at a first location proximate to a user thereof while ROM 506, or similar memory device, containing machine-executable functional instructions associated with one or more custom tags, is at a second location. In this arrangement, ROM 506 may be coupled to processor 502 and browser 112 by a fixed or wireless link 114.

In a second alternative embodiment, a first portion of the machine-executable instructions associated with custom tags may be resident on client 108 while a second portion of machine-executable instructions is resident on server 102. By way of example, the second portion of machine-executable instructions may comprise an authorization means such as a password which is required by client 108 before the first portion of machine-executable instructions can be used with active core 110 and browser 112.

The claims should not be read as limited to the described order or elements unless stated to that effect. Therefore, all embodiments that come within the scope and spirit of the following claims and equivalents thereto are claimed as the invention.

The invention claimed is:

1. A system comprising:
   at least one processor in a client computer;
   a computer readable memory for storing program code to execute on said at least one processor to load a markup language document, said program code including program code for receiving said document, said document comprising a plurality of tags, at least one of said plurality of tags being a custom tag, program code for parsing said document to determine if certain of said plurality of tags is said custom tag, wherein said parsing includes scanning a document object model (DOM) representation of said document for the presence of said custom tag, program code for inserting, by a Web browser executing on said client computer and prior to rendering of said document on a display device, executable instructions into said document at a location of said custom tag, if said custom tag is present, wherein said inserting includes modifying said DOM representation of said document to replace said custom tag with said executable instructions, wherein said executable instructions are for rendering a tree control display, program code for executing said executable instructions for rendering said tree control display, and program code for rendering said document including said tree control display on said display device.

2. The system of claim 1 wherein said markup language is HTML.

3. The system of claim 1 wherein said document is received over the internet.

4. The system of claim 1 wherein said rendering further comprises using said Web browser.

5. A computer program product, comprising:
   a computer readable storage medium for storing program code executable on at least one processor in a client computer to load a markup language document, said program code including program code for receiving said document, said document comprising a plurality of tags, at least one of said plurality of tags being a custom tag, program code for parsing said document to determine if certain of said plurality of tags is said custom tag, wherein said parsing includes scanning a document object model (DOM) representation of said document for the presence of said custom tag, program code for inserting, by a Web browser executing on said client computer and prior to rendering of said document on a display device, executable instructions into said document at a location of said custom tag, if said custom tag is present, wherein said inserting includes modifying said DOM representation of said document to replace said custom tag with said executable instructions, wherein said executable instructions are for rendering a tree control display, program code for executing said executable instructions for rendering said tree control display, and program code for rendering said document including said tree control display on said display device.

6. A system for loading a markup language document, comprising:
   means for receiving said document, said document comprising a plurality of tags, at least one of said plurality of tags being a custom tag;

means for parsing said document to determine if certain of said plurality of tags is said custom tag, wherein said parsing includes scanning a document object model (DOM) representation of said document for the presence of said custom tag;

means for inserting, by a Web browser executing on a client computer and prior to rendering of said document on a display device, executable instructions into said document at a location of said custom tag, if said custom tag is present, wherein said inserting includes modifying said DOM representation of said document to replace said custom tag with said executable instructions, wherein said executable instructions are for rendering a tree control display;

means for executing said executable instructions for rendering said tree control display; and means for rendering said document including said tree control display on said display device.

7. A system for creating and providing a markup language document, comprising:

a receiving computer including at least one processor and computer readable memory;

a server computer including at least one processor and computer readable memory;

program code for loading said document into said computer readable memory of said server computer, said document containing conventional tags and at least one custom tag, said custom tag associated with machine-executable instructions resident on said receiving computer, wherein said receiving computer is in communication with a network;

program code for providing said document from said server computer to said receiving computer over said network; and program code for identifying said custom tag, wherein said identifying includes scanning a document object model (DOM) representation of said document in said receiving computer for the presence of said custom tag, and inserting, by a Web browser executing on said client computer and prior to rendering of said document on a display device, said machine-executable instructions into said document at a location associated with said custom tag, wherein said inserting includes modifying said DOM representation of said document to replace said custom tag with said machine-executable instructions, wherein said executable instructions are for rendering a tree control display.

8. The system of claim 7 wherein said markup language is HTML.

9. The system of claim 7 wherein said receiving computer is a client computer.

10. The system of claim 7 wherein said network is an Internet protocol (IP) network.

11. The system of claim 7 wherein said receiving computer renders said document on a display device using said Web browser.

12. A computer program product, comprising:

a computer readable medium having program code stored thereon for creating and providing a markup language document, said program code including:

program code for loading said document into a memory of a server computer, said document containing conventional tags and at least one custom tag, said custom tag associated with machine-executable instructions resident on a receiving computer, wherein said receiving computer is in communication with a network, program code for providing said document from said server computer to said receiving computer over said network, and program code for identifying said custom tag, wherein said identifying includes scanning a document object model (DOM) representation of said document in said receiving computer for the presence of said custom tag, and inserting, by a Web browser executing on said client computer and prior to rendering of said document on a display device, said machine-executable instructions into said document at a location associated with said custom tag, wherein said inserting includes modifying said DOM representation of said document to replace said custom tag with said machine-executable instructions, wherein said executable instructions are for rendering a tree control display.

13. A system for creating and providing a markup language document, comprising:

means for loading said document into a memory of a server computer, said document containing conventional tags and at least one custom tag, said custom tag associated with machine-executable instructions resident on a receiving computer, wherein said receiving computer is in communication with a network;

means for providing said document from said server computer to said receiving computer over said network; and means for identifying said custom tag, wherein said identifying includes scanning a document object model (DOM) representation of said document in said receiving computer for the presence of said custom tag, and inserting, by a Web browser executing on said client computer and prior to rendering of said document on a display device, said machine-executable instructions into said document at a location associated with said custom tag, wherein said inserting includes modifying said DOM representation of said document to replace said custom tag with said machine-executable instructions, wherein said executable instructions are for rendering a tree control display.

* * * * *